United States Patent
Plummer

[11] 3,810,221
[45] May 7, 1974

[54] VIEWFINDER FOR A REFLEX CAMERA
[75] Inventor: William T. Plummer, Concord, Mass.
[73] Assignee: Polaroid Corporation, Cambridge, Mass.
[22] Filed: Nov. 11, 1971
[21] Appl. No.: 197,851

[52] U.S. Cl. ................ 88/1.5 R, 95/11 V, 95/42, 350/193
[51] Int. Cl. .......................... G03b 13/02
[58] Field of Search ............ 88/1.5 R; 350/193, 204; 95/11 V, 42

[56] References Cited
UNITED STATES PATENTS
3,634,617   1/1972   Welford .................. 350/193 UX

*Primary Examiner*—Ronald L. Wibert
*Assistant Examiner*—F. L. Evans

[57] ABSTRACT

A special eye lens in a viewfinder for a reflex camera compensates for field tilt in a virtual image, thereby minimizing the depth accommodation required of an observer's eye to focus the virtual image at top and bottom. The field tilt stems from an oblique orientation of the axis of the viewfinder at its incidence with a focusing screen in the reflex camera. To compensate for it, a special refracting surface is formed on the eye lens. The ophthalmic power of the special refracting surface varies with its vertical distance from the axis, causing the power of the eye lens to vary accordingly. A polynomial of at least the third order best describes the three-dimensional shape of the special refracting surface having mirror symmetry, but not rotational symmetry.

14 Claims, 3 Drawing Figures

VIEWFINDER FOR A REFLEX CAMERA

BACKGROUND OF THE INVENTION

The construction of a compact reflex camera requires special optical designs as well as special arrangements of the various components of the actual optical system. U. S. patent application, Ser. No. 98,356, for a Reflex Camera and Viewing Device, filed Dec. 15, 1970, by James G. Baker and assigned to Polaroid Corporation describes such a novel arrangement of optical components in a viewfinder for a compact reflex camera. In that arrangement a focusing screen, that the viewfinder re-images for an operator, is at an oblique angle to the axis of te viewfinder at their intersection. One consequence of the oblique orientation of the focusing screen to the axis is a tilted field of view; that is, the top portion of the field seems to focus much closer than the middle, and the bottom portion seems to focus much further away than the middle. The difference can exceed the usual depth of focus of a normal eye. Thus, an observer must refocus his eye as he shifts his glance from the top to the bottom of the field. Some observers, particularly those over fifty years of age, find it quite difficult to refocus their eye as they shift their glance from the top to the bottom. Minimizing or eliminating the need for refocusing simplifies the use of the viewfinder for a user who might otherwise be discomforted by having to refocus his eye.

SUMMARY AND OBJECTS OF THE INVENTION

An object of the present invention is to provide an optical element for a viewfinder which will reduce the visual accommodation required of a user.

Another object of the present invention is to provide an optical design for an eye lens to minimize field tilt in a viewfinder.

Other objects of the invention will in part be obvious and will in part appear hereinafter.

These and other objects of the invention are accomplished in a viewfinder, comprising a concave mirror and an eye lens arranged to provide a virtual image of a focusing screen, whose axis obliquely intersects the focusing screen, by providing the eye lens wih a special refracting surface. The oblique orientation of the axis to the focusing screen causes a field tilt in the virtual image noticeable by a user of the viewfinder. The power of the special refracting surface increases asymmetrically from the top to the bottom of the eye lens so as to optically compensate for the field tilt. A polynomial expression of at least the third order describes the shape of the special refracting surface having mirror symmetry, but not rotational symmetry.

The general form of the polynomial expression follows:

$$U = \frac{c(V^2 + W^2)}{1 + \sqrt{1 - c^2(V^2 + W^2)}} + \beta(V^2 + W^2)^2 + \gamma(V^2 + W^2)^3 + G_{20}V^2 + G_{30}V^3 + G_{40}V^4 + G_{12}VW^2 + G_{22}V^2W^2 + G_{04}W^4$$

The letters V and W represent coordinates on a plane transverse to the axis of the viewfinder, and the letter U represents the height of the special refracting surface from the plane. The meaning of the various terms in the polynomial expression is described below.

The coefficients of the polynomial terms determine the change in optical power of the surface from its top to its bottom. They are selected according to the magnitude of the field tilt and the amount of correction desired. Other terms in the polynomial represent corrections for certain common optical aberrations and also impart a nominal spherical optical power to the surface apart from the corrections.

DESCRIPTION OF THE DRAWINGS

Other objects and many of the attendant advantages of the present invention will be better appreciated and said invention will become more clearly understood by reference to the following detailed description when considered in conjunction with the accompanying drawings illustrating the instant invention, wherein:

FIG. 3 illustrates another embodiment of the special refracting surface.

THE PREFERRED EMBODIMENT

Figure 1:
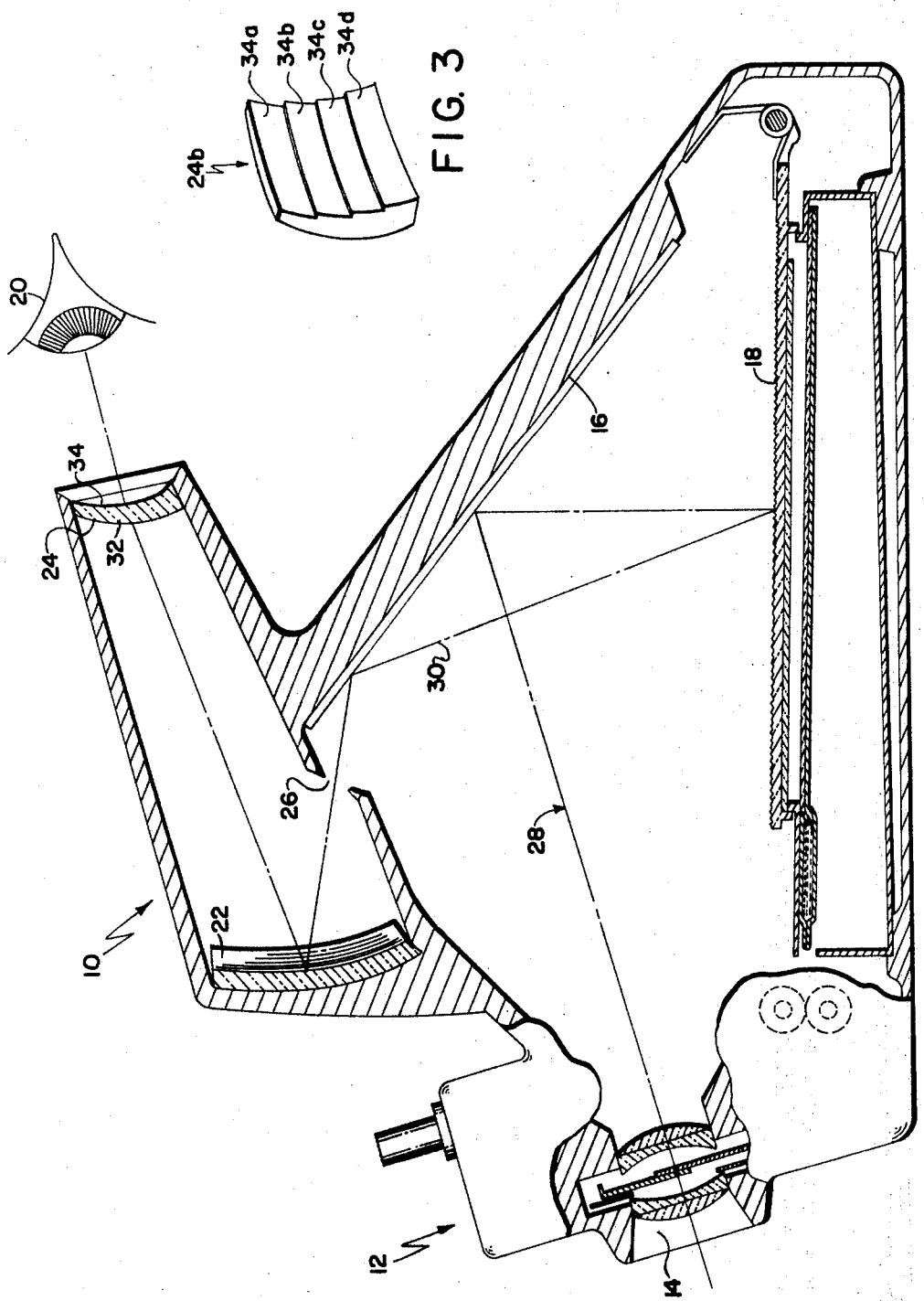
FIG. 1 illustrates a viewfinder according to the present invention.

FIG. 1 illustrates a viewfinder 10 mounted on a reflex camera 12. The reflex camera 12 comprises an objective lens 14 and a reflex mirror 16 that reflects a real image formed by the objective lens 14 to a focusing screen 18. An operator, represented by an eye 20, observes the focusing screen 18 through the viewfinder 10 while focusing the objective lens 14 to form the sharpest real image possible on the focusing screen 18.

The viewfinder 10 comprises a concave mirror 22 that forms a real aerial image of the focusing screen 18 and an eye lens 24 that magnifies the real aerial image. An entrance aperture 26 located at a focus of the concave mirror 22 promotes acuity in the image seen by the observer 20.

A light ray 28 indicates the path of light along the axis of the objective lens 14 to the reflex mirror 16 which reflects it toward the focusing screen 18. Another light ray 30 illustrates the path of light emanating from the focusing screen 18, reflecting from the upper portion of the relfex mirror 16, passing through the entrance aperture 26, into the viewfinder 10. The light ray 30 emanating from the center of the focusing screen 18 at an oblique angle defines an axis of the viewfinder 10.

The above-mentioned U. S. patent application, Ser. No. 98,356, describes the entire arrangement in greater detail. As noted therein, the arrangement of the optical parts results in an inverted keystone-shape image in the viewfinder (wherein an object in the field appears tilted toward the observer) if the concave mirror 22 has merely a spherical reflecting surface, because the optical path distance from the rearmost portion of the focusing screen 18 to the entrance aperture 26 exceeds the optical path distance from the forwardmost portion. To compensate for this, so the viewfinder image will appear rectangular and objects will not appear tilted, the concave mirror 22 has a complex non-spherical reflecting surface derived from an ellipsoid. The following polynomial expression described, in mathematical terminology, the cross-sectional shape of that non-spherical reflecting surface.

EQUATION OF CONCAVE MIRROR
$$Y_m = P_1X + P_2X^2 + P_3X^3 + P_4X^4 + P_5X^5 + P_6X^6$$
being a polynomial power series approximation to the desired surface, where, for example:

$P_1 = 0.0087470$;
$P_2 = 0.2698164/in.$;
$P_3 = 0.0193959/in.^2$;
$P_4 = 0.0101742/in.^3$;
$P_5 = 0.0090011/in.^4$; and
$P_6 = 0.0017030/in.^5$.

The mirror is a portion, whose center is displaced about 0.70 inches from the axis of rotation, $Y_m$, of the surface of revolution generated by rotating the curve obtained for positive values of X, about the $Y_m$ axis.

The front surface 32 of the eye lens 24 has a radius of curvature equal to 0.8077 inches. The rear surface of the eye lens 24 comprises a novel surface 34 described by the polynomial expression set out below.

$$U = \frac{c(V^2+W^2)}{1+\sqrt{1-c^2(V^2+W^2)}} + \beta(V^2+W^2)^2 \\ + \gamma(V^2+W^2)^3 + G_{20}V^2 + G_{30}V^3 + G_{40}V^4 + G_{12}VW^2 \\ + G_{22}V^2W^2 + G_{04}W^4$$

where U is the height of the special refracting surface 34 from a reference plane transverse to the axis of the eye lens 24; V and W are, respectively, vertical and horizontal coordinate axes in that plane.

The shape of the novel surface 34 also contributes to the quality of the viewfinder image seen by the observer 20 and complements the optical design of the concave mirror 22. The first term of the polynomial expression describes the nominal spherical shape of the special refracting surface 34. The second and third terms describe aspheric, but rotationally symmetric, modifications to the nominal spherical shape. They represent changes at the periphery of the surface 34 with little, if any, effect at the center of the surface 34. The remaining terms (the analytic terms) describe non-rotationally symmetric modifications of the surface 34 to correct for the field tilt otherwise present in the image formed by the viewfinder 10.

The fourth through sixth terms are meridional terms; i.e., they do not effect the shape (i.e., the height U) of the surface along the meridian defined by W = zero. The fourth term, $G_{20}V^2$, changes the height of the surface in parabolic fashion toward the upper and lower peripheries with little effect on the surface at its central horizontal region and none on the surface at the meridian (W = zero). The fifth term, $G_{30}V^3$, has less effect on the surface at the center than the fourth term, $G_{20}V^2$, but more effect toward the periphery where it causes the surface to change rapidly. The odd order causes the fifth term to turn the upper and lower portions of the periphery of the surface 34 in different directions. The sixth term $G_{40}V^4$, has still less effect at the center than either the fourth or fifth; but at the periphery it changes the height more rapidly than either of them, bending both edges in the same direction.

The seventh term, $G_{12}VW^2$, changes the height of the surface in parabolic fashion toward the lateral peripheries; however, the presence of V in the seventh term accentuates the parabolic shape toward the upper and lower peripheries in opposite directions, but reduces the effect of the term on the surface horizontally across the center. The eighth term, $G_{22}V^2W^2$, achieves fiarly strong curvature midway between the V and W coordinate axes while not effecting the surface along the coordinate axes proper. The nineth term, $G_{04}W^4$, is analogous to the sixth term, $G_{40}V^4$, but its effect is orthogonal to the sixth term.

For use with the mirror 22 of the example above, the symbols describing the surface 34 have the following values:

C = .0497.in. (the reciprocal of the radius of the nominal shape for the special refracting surface 34)

$\beta = -.0538906/in.^3$       $\gamma = .0645525/in.^5$
$G_{20} = .0145096/in.$         $G_{30} = -.0317059/in.^2$
$G_{40} = -.0224743/in.^3$      $G_{12} = -.0485403/in.^2$
$G_{22} = .0071924/in.^3$       $G_{04} = .0067799/in.^3$.

The axes joining the centers of the front surface 32 and the special refracting surface tilts with respect to the axis of the viewfinder 10 (denoted by light ray 30). While the example incorporates the novel variations on the rear surface of the eye lens 24, it will be understood that the present concept includes incorporating them on the front surface of the eye lens instead, or on any other optical surface in the viewfinder 10, with appropriate changes in the constants.

Figure 2:
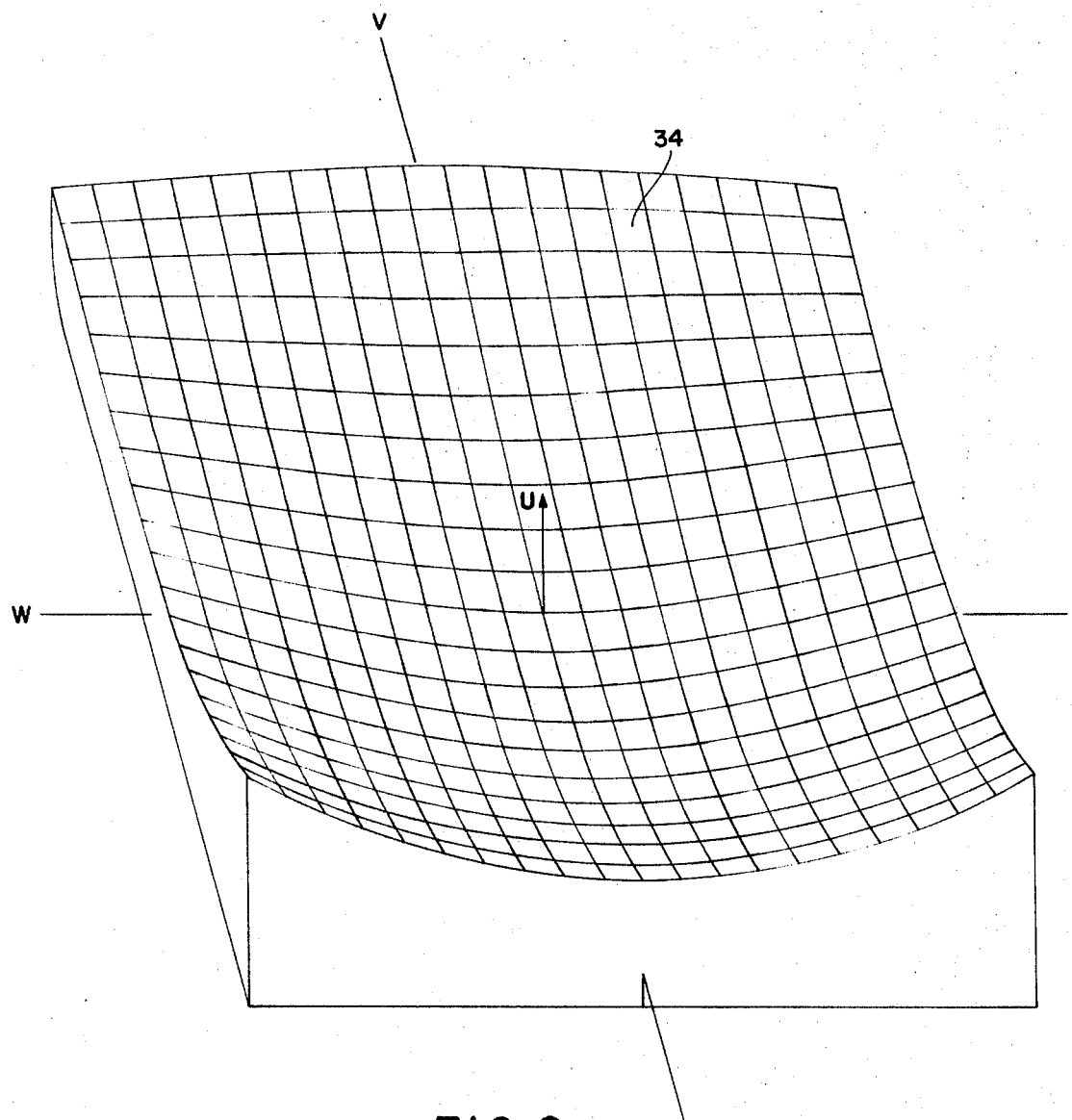
FIG. 2 illustrates the shape of a special refracting surface.

The analytic terms define a non-rotational variation in the power of the special refracting surface 34 from top to bottom. Reference should be had to FIG. 2 wherein a representation of the surface, with the height exaggerated, is shown. This variation in the power focuses portions of the virtual image in the viewfinder 10 differently from top to bottom. The upper portion of the eye lens 24 has more dioptric power than its middle portion because the surface 32 is convex everywhere and at the top of the lens 24 the surface 34 is convex, whereas at the middle of the surface 34 it is concave. Thus, the sum of the dioptric powers of the surfaces 32 and 34 at the middle of the lens 24 is less than the sum at its top, and the sum of the dioptric powers of the surfaces 32 and 34 at the bottom is still less because the surface 32 is even more concave (see FIG. 2).

The top of the real image formed by the mirror 22 is focused and magnified by the top of the eye lens 24 and the middle and bottom portions of the real image are focused and magnified by the middle and bottom, respectively, of the eye lens 24. The middle of the real image is further from the eye lens 24 than the top, and the bottom is still further. The middle of the eye lens 24 has a power selected for comfortable viewing and magnification, and the top and bottom of the eye lens have more and less power, respectively, than the middle of the eye lens 24. Thus, the special surface 34 minimizes or eliminates visual accommodation required of the observer 20 in scanning the virtual image from top to bottom.

It is within the scope of the present concept to achieve a similar reduction in the visual accommodation required of the observer 20 by using a plurality of incremental optical changes rather than the continuously changing surface described above. An incremental eye lens 24b is shown in FIG. 3. The rear surface comprises several refracting surfaces 34a, 34b, 34c, and 34d, each with more negative power than the preceding section. The eye lens 24b can be substituted for the eye lens 24.

In the overall design, the shape of the concave mirror 22 corrects the otherwise keystone-shape of the image in the viewfinder and the perspective tilt associated with it and the special refracting surface 34 corrects the focus tilt of the image otherwise present, i.e., it causes the image to focus in a single plane.

It can be readily understood that many variations and modifications of the present invention are possible in light of the aforementioned teachings, and it will be apparent to those skilled in the art that various changes in form and arrangement of components may be made to suit requirements without departing from the spirit and scope of the invention. It is, therefore, to be understood that, within the scope of the appended claims, the instant invention may be practiced in a manner otherwise than specifically described herein.

What is claimed is:

1. A viewfinder comprising:
   means for forming a real image of a focusing screen positioned at an oblique angle to the optic axis of said viewfinder; and
   means for magnifying said real image to form a virtual image thereof, said magnifying means including an optical surface with a non-rotational shape for minimizing the field tilt otherwise associated with said virtual image.

2. The viewfinder described in claim 1, wherein said means for forming a real image of a focusing screen comprises a concave mirror and said means for magnifying said real image comprises a lens.

3. The viewfinder described in claim 2, wherein said optical surface with a non-rotational shape comprises a continuously contoured shape on the refracting surface of said lens situate away form said concave mirror.

4. The viewfinder described in claim 3, wherein said concave mirror has a non-spherical surface derived from an ellipsoid.

5. The viewfinder described in claim 1, wherein said optical surface has a plurality of discrete zones of increasing refracting power.

6. A viewfinder, comprising:
   optical means, having a viewing axis, for forming a real image of a focusing screen oriented at an oblique angle with said viewing axis;
   eye lens means for magnifying said real image to form a virtual image; and
   correcting means for minimizing the field tilt of said virtual image otherwise apparent to a user of said viewfinder.

7. The viewfinder described in claim 6, wherein said correcting means comprises:
   a refracting surface on said eye lens means whose dioptric power differs between adjacent areas in relation to the optical distance from said refracting surface of the portions of said real image associated with said areas.

8. The viewfinder described in claim 7, wherein said refracting surface has a plurality of discrete zones of increasing refracting power.

9. The viewfinder described in claim 7, wherein said refracting surface has a contour, described by a non-rotational polynomial of at least the third order, so said dioptric power varies continuously with the height, on said refracting surface, from the axis of said eye lens.

10. The viewfinder described in claim 7, wherein said refracting surface is situate away from said optical means and said optical means comprises a concave mirror.

11. The viewfinder described in claim 10, wherein said concave mirror has a non-spherical surface derived from an ellipsoid.

12. The viewfinder described in claim 9, wherein said non-rotational polynomial comprises the following terms:

$$G_{20}V^2 + G_{30}V^3 + G_{40}V^4$$

wherein V designates a coordinate direction transverse to the axis of said viewfinder in which the height from said surface is to be measured, and the subscripted G terms represent preselected constants.

13. The viewfinder described in claim 12, wherein said non-rotational polynomial comprises the terms:

$$U = \frac{c(V^2 + W^2)}{1 + \sqrt{1 - c^2(V^2 + W^2)}} + \beta(V^2 + W^2)^2 + \gamma(V^2 + W^2)^3 + G_{20}V^2 + G_{30}V^3 + G_{40}V^4 + G_{12}VW^2 + G_{22}V^2W^2 + G_{04}W^4[.]$$

where U, V, and W designate coordinate directions, U being the direction of the viewfinder's axis at said refracting surface, V and W being transverse to said axis and each other, c represents the reciprocal of the normal radius of said refracting surface, and $\beta$, $\gamma$, and the subscripted G terms represent preselected constants.

14. A viewfinder comprising:
   a concave mirror for forming a real image of a focusing screen positioned at an oblique angle to the optic axis of said viewfinder, said concave mirror having a shape that is a portion of a surface of revolution, about a $Y_m$ axis, for the positive values of X, of the curve described by the equation:

$$Y_m = P_1X + P_2X^2 + P_3X^3 + P_4X^4 + P_5X^5 + P_6X^6$$

an eye lens with two refracting surfaces for magnifying said real image to form a virtual image, the surface of said lens toward said mirror has a radius of 0.8077 inches and the surface away from said concave mirror has a continuously contoured non-rotational shape descrived by the equation:

$$U = \frac{c(V^2 + W^2)}{1 + \sqrt{1 - c^2(V^2 + W^2)}} + \beta(V^2 + W^2)^2 + \gamma(V^2 + W^2)^3 + G_{20}V^2 + G_{30}V^3 + G_{40}V^4 + G_{12}VW^2 + G_{22}V^2W^2 + G_{04}W^4$$

wherein the constants have the values and meanings tabulated below:

$P_1 = 0.0087470$;
$P_2 = 0.2698164/in.$;
$P_3 = 0.0193959/in.^2$;
$P_4 = 0.0101742/in.^3$;
$P_5 = 0.0090011/in.^4$; and
$P_6 = 0.0017030/in.^5$ U, V, and W are coordinates, U coinciding with the viewfinder's axis, C = .0497/in. (the reciprocal of the radius of the nominal shape for the special refracting surface 34)

$\beta = -.0538906/in.^3$
$G_{20} = .0145096/in.$
$G_{40} = -.0224743/in.^3$
$G_{22} = .0071924/in.^3$
$\gamma = .0645525/in.^5$
$G_{30} = -.0317059/in.^2$
$G_{12} = -.0485403/in.^2$
$G_{04} = .0067799/in.^3$.

* * * * *